United States Patent
Shen

(10) Patent No.: US 8,942,632 B2
(45) Date of Patent: Jan. 27, 2015

(54) PROCESSOR-INDEPENDENT COMMUNICATION OF NETWORK AVAILABILITY

(71) Applicant: Qualcomm Incorporated, San Diego, CA (US)

(72) Inventor: Shu Wei Shen, Taipei (TW)

(73) Assignee: QUALCOMM Incorporated, San Diego, CA (US)

(*) Notice: Subject to any disclaimer, the term of this patent is extended or adjusted under 35 U.S.C. 154(b) by 195 days.

(21) Appl. No.: 13/672,583

(22) Filed: Nov. 8, 2012

(65) Prior Publication Data
US 2014/0065967 A1    Mar. 6, 2014

Related U.S. Application Data

(60) Provisional application No. 61/693,954, filed on Aug. 28, 2012.

(51) Int. Cl.
*H04B 7/00* (2006.01)
*H04W 80/00* (2009.01)
*H04W 88/04* (2009.01)

(52) U.S. Cl.
CPC .............. *H04W 80/00* (2013.01); *H04W 88/04* (2013.01); *Y02B 60/50* (2013.01)
USPC ......................................................... 455/41.2

(58) Field of Classification Search
USPC ............... 455/41.2, 41.3, 39, 509, 513, 552.1
See application file for complete search history.

(56) References Cited

U.S. PATENT DOCUMENTS

| | | | | |
|---|---|---|---|---|
| 7,917,089 | B2* | 3/2011 | Zheng et al. | 455/41.2 |
| 8,606,182 | B2* | 12/2013 | Wyper et al. | 455/41.2 |
| 2004/0058651 | A1* | 3/2004 | Ross et al. | 455/67.11 |
| 2008/0043705 | A1* | 2/2008 | Desai et al. | 370/346 |
| 2009/0081962 | A1 | 3/2009 | Sohrabi | |
| 2010/0128695 | A1 | 5/2010 | Nagaraja | |
| 2011/0018761 | A1 | 1/2011 | Walley et al. | |
| 2011/0021143 | A1 | 1/2011 | Kapur et al. | |
| 2012/0163307 | A1 | 6/2012 | Wang et al. | |
| 2012/0182927 | A1 | 7/2012 | Wiesner et al. | |

OTHER PUBLICATIONS

International Search Report and Written Opinion—PCT/US2013/053657—ISA/EPO—Oct. 24, 2013.
Decuir, J., "Bluetooth 4.0: Low Energy," CSR, 2010, pp. 1-62.
"Texas Instruments CC2540/41 Bluetooth Low Energy Software Developer's Guide," Texas Instruments, Document No. SWRU271B, 2012, pp. 1-49.
VMware Knowledge Base, "No storage devices are visible with Broadcom iSCSI offload-enabled adapters," http://kb.vmware.com/selfservice/microsites/search.do?language=en_US&cmd=displayKC&externalId=1025644, May 28, 2012, pp. 1-4.

\* cited by examiner

*Primary Examiner* — Sonny Trinh
(74) *Attorney, Agent, or Firm* — Mahamedi Paradice LLP

(57) ABSTRACT

In some embodiments, an electronic device includes a host processor and a module, coupled to the host processor, to communicate over a wireless network using a first wireless communications protocol. The electronic device also includes a controller, coupled to the host processor and the module, to communicate wirelessly with a remote device using a second wireless communications protocol, to obtain a status of the wireless network from the module independently of the host processor, and to transmit the status of the wireless network to the remote device.

32 Claims, 7 Drawing Sheets

PROCESSOR-INDEPENDENT COMMUNICATION OF NETWORK AVAILABILITY

RELATED APPLICATION

This application claims priority to U.S. Provisional Patent Application No. 61/693,954, titled "System and Method for Communicating Network Availability," filed Aug. 28, 2012, which is hereby incorporated by reference in its entirety.

TECHNICAL FIELD

The present embodiments relate generally to wireless communication systems and more specifically to systems and methods for communicating network status information between devices.

BACKGROUND OF RELATED ART

A wireless device may be wirelessly connected to a remote device using a wireless communications protocol such as Bluetooth. If the wireless device also has access to a wireless network that the remote device cannot access directly, then the wireless device may act as a gateway that provides the remote device with access to the wireless network. The wireless device may provide network status information as well as network access to the remote device. However, implementing these functions using a host processor in the wireless device may result in undesirable delays and power consumption.

BRIEF DESCRIPTION OF THE DRAWINGS

The present embodiments are illustrated by way of example and are not intended to be limited by the figures of the accompanying drawings.

Like reference numerals refer to corresponding parts throughout the figures and specification.

DETAILED DESCRIPTION

Figure 1:
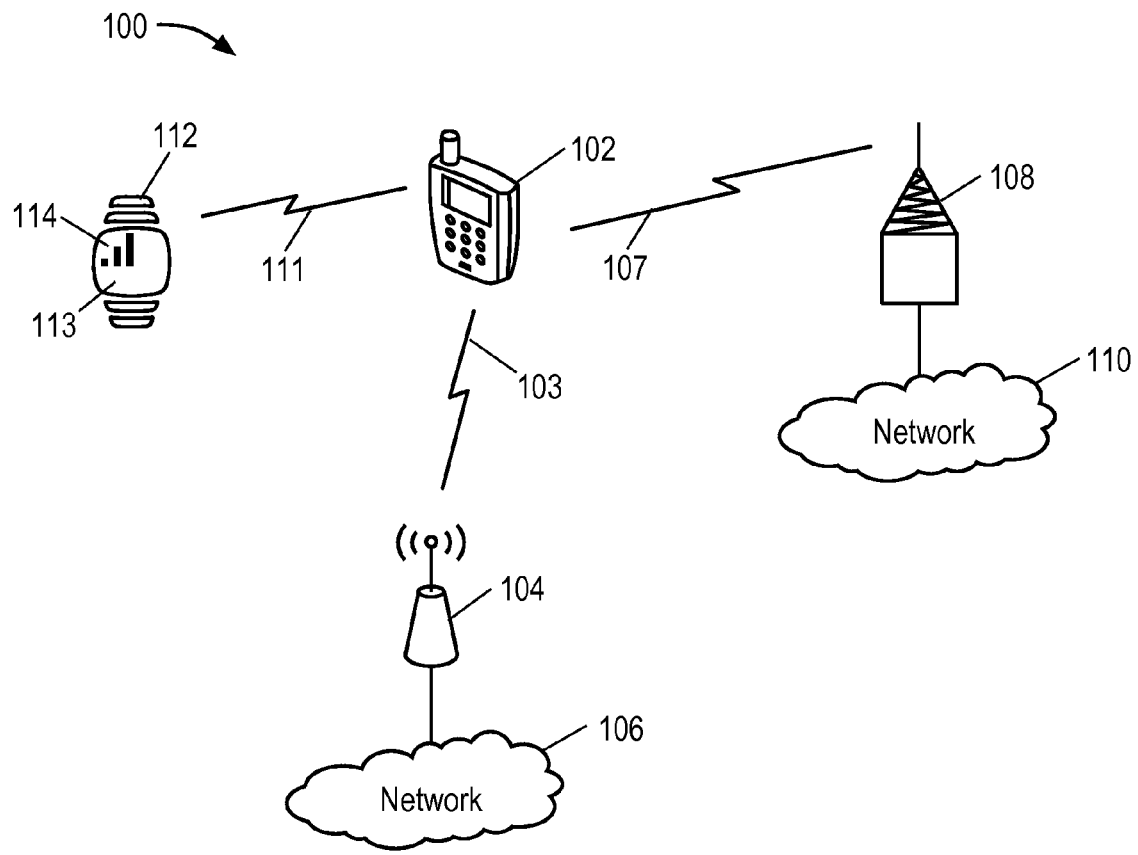
FIG. 1 shows a wireless communication system in which a wireless device is wirelessly connected to a remote device and one or more wireless networks in accordance with some embodiments.

Embodiments are disclosed that allow a controller in an electronic device to obtain network status information and provide the network status information to a remote device independently of a host processor in the electronic device.

In some embodiments, an electronic device includes a host processor and a module, coupled to the host processor, to communicate over a wireless network using a first wireless communications protocol. The electronic device also includes a controller, coupled to the host processor and the module, to communicate wirelessly with a remote device using a second wireless communications protocol, to obtain a status of the wireless network from the module independently of the host processor, and to transmit the status of the wireless network to the remote device.

In some embodiments, a method of operating an electronic device is performed. The electronic device includes a host processor, a module to communicate over a wireless network using a first wireless communications protocol, and a controller to communicate wirelessly with a remote device using a second wireless communications protocol. In the method, a request from the remote device for a status of the wireless network is received in the controller. The controller obtains the status of the wireless network from the module, independently of the host processor, and transmits the status of the wireless network to the remote device.

In some embodiments, a non-transitory computer-readable storage medium stores one or more programs configured to be executed by a controller in an electronic device. The electronic device further includes a host processor and a module to communicate over a wireless network using a first wireless communications protocol. The controller is configured to communicate wirelessly with a remote device using a second wireless communications protocol. The one or more programs include instructions to obtain a status of the wireless network from the module, independently of the host processor, in response to a request from the remote device. The one or more programs also include instructions to transmit the status of the wireless network to the remote device.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

FIG. 1 schematically illustrates a wireless communication system 100 embodying aspects of this disclosure. As shown, a mobile wireless electronic device (e.g., a mobile phone) 102 may be configured to access one or more wireless networks. For example, a link 103 in a wireless local area network (WLAN) (e.g., a WiFi network implemented in accordance with an IEEE 802.11 protocol) couples the wireless device 102 with a wireless access point 104, through which the wireless device 102 can access a wide area network (WAN) 106 (e.g., the Internet). In additional, or alternatively, a link 107 in a cellular network (e.g., an LTE network) couples the wireless device 102 with a cellular base station 108, through which the wireless device 102 can access a WAN 110 (e.g., the Internet). The WANs 106 and 110 may provide access to similar or different resources and may be the same network (e.g., the Internet). In general, the WLAN that includes the link 103 and/or the cellular network that includes the link 107 are implemented using suitable radio access technologies (RATs). Examples of RAT networks include wireless networks using Code Division Multiple Access (CDMA), Time Division Multiple Access (TDMA), Frequency Division Multiple Access (FDMA), Orthogonal FDMA (OFDMA), Single-Carrier FDMA (SC-FDMA), etc.

The illustration of the wireless device 102 as a mobile phone in FIG. 1 is merely an example. Other examples include, but are not limited to, tablet computers, laptop computers, personal digital assistants, and the like. Furthermore, the wireless device 102 need not be mobile.

The wireless device 102 is also configured to communicate over a wireless link 111 with a remote device (e.g., a watch) 112. In some embodiments, the link 111 is a Bluetooth link. For example, the remote device 112 is a Bluetooth Low Energy (BLE) device, and the wireless device 102 includes a BLE transceiver for communicating with the remote device 112. In some embodiments, the remote device 112 uses a "single-mode" BLE implementation characterized by a lightweight Low Energy Link Layer (LE LL) in the Bluetooth protocol stack to provide low power idle mode operation and power save modes, simple device discovery and reliable data transfer. The illustration of the remote device 112 as a watch in FIG. 1 is merely an example. Other examples include, but are not limited to, sensors, monitors, and meters (e.g., in applications such as sports, wellness, healthcare, entertainment, toys, industrial equipment, etc.). In some embodiments, the remote device 112 is battery-powered (e.g., using button-cell batteries).

In some embodiments, the remote device 112 includes a user interface (e.g., a display) 113 that displays an icon 114 showing a network status (e.g., for the WLAN or cellular network that includes link 103 or 107) of the wireless device 102. For example, the icon 114 illustrates whether the wireless device 102 is connected to WLAN and/or cellular networks via the links 103 and/or 107. The remote device 112 may also display other information regarding the network status of the wireless device 102, such as the type of network, signal strength, and available data transfer rate. The remote device 112 obtains the network status of the wireless device 102 over the link 111.

In some embodiments, the remote device 112 may also access network resources (e.g., the WANs 106 and/or 110) through the link 111, wireless device 102, and links 103 and/or 107. For example, the remote device 112 retrieves data from the networks 106 and/or 110 for display or other use or uploads information (e.g., sensor measurements) to the networks 106 and/or 110. The wireless device 102 thus serves as a gateway through which the remote device 112 can access the networks 106 and/or 110.

Figure 2:
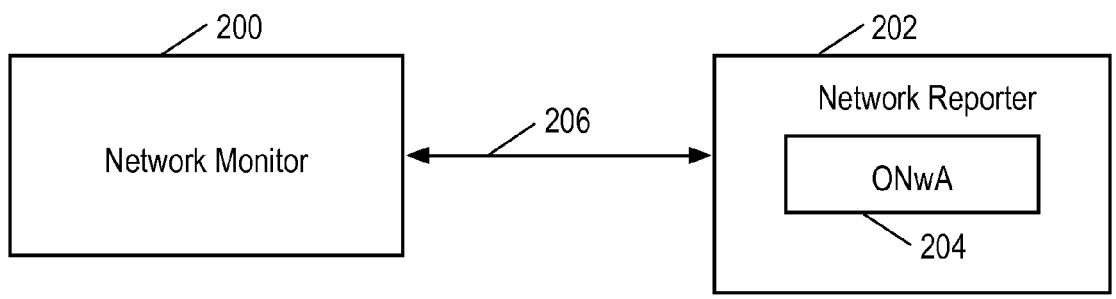
FIG. 2 is a block diagram showing a network monitor wirelessly connected to a network reporter that has an offloaded network availability service in accordance with some embodiments.

As described, the remote device 112 monitors the network status of the wireless device 102, as reported to it by the wireless device 102 through the link 111. The remote device 112 is thus said to function in a network monitor role and the wireless device 102 is said to function in a network reporter role (e.g., in accordance with terminology adopted by the Bluetooth Special Interest Group). FIG. 2 is a block diagram showing a network monitor 200 (e.g., the remote device 112, FIG. 1) with a wireless connection 206 (e.g., via the wireless link 111, FIG. 1) to a network reporter 202 (e.g., the wireless device 102, FIG. 1). The network monitor 200 may request information from the network reporter 202 about the network status of the network reporter 202. A network availability service 204 (e.g., as implemented using a Bluetooth profile) of the network reporter 202 processes and responds to the request. To save power in the network reporter 202 and to reduce response time, the network availability service 204 is offloaded from the host processor (e.g., host processor 324, FIG. 3) of the network reporter 202, which allows the network reporter 202 to respond to the request independently of the host processor. For example, if the host processor is idle and has entered a power saving mode, the network reporter 202 may respond to the request without waking the host processor from the power saving mode. Because the network availability service 204 is offloaded from the host processor, it is referred to as an offloaded network availability (ONwA) service 204.

Figure 3:
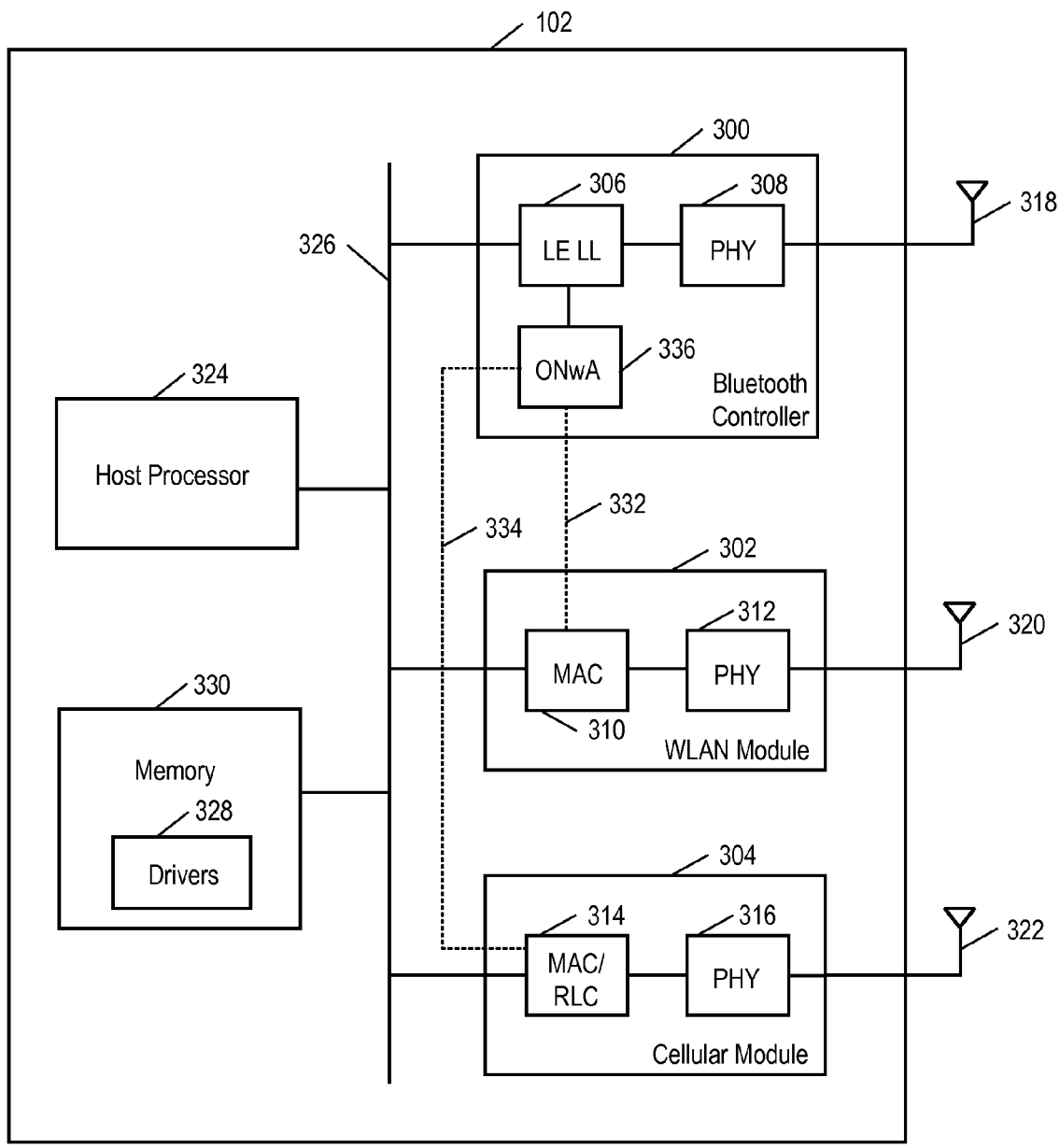
FIG. 3 is a schematic block diagram of a wireless device that functions as a network reporter in accordance with some embodiments.

FIG. 3 is a schematic block diagram of a wireless device 102 (FIG. 1) in accordance with some embodiments, and is thus an example of a network reporter 202 (FIG. 2). The wireless device 102 includes a Bluetooth controller 300 coupled to a Bluetooth antenna 318, a WLAN (e.g., WiFi) module 302 coupled to a WLAN antenna 320, and a cellular (e.g., LTE) module 304 coupled to a cellular antenna 322. The Bluetooth controller 300 processes Bluetooth communications with the remote device 112 via the link 111 (FIG. 1). The WLAN module 302 processes WLAN (e.g., WiFi) communications with the access point 104 via the WLAN link 103 (FIG. 1). The cellular module 304 processes cellular (e.g., LTE) communications with the base station 108 via the cellular network link 107. The controller 300, module 302, and module 304 thus each communicate wirelessly using a distinct wireless communications protocol. The controller 300, module 302, and module 304 each include a transceiver that operates in accordance with the corresponding wireless communications protocol.

The wireless device also includes a host processor (e.g., a central processing unit or CPU) 324 and memory 330. The host processor 324 runs an operating system and device applications. A bus 326 couples the host processor 324, memory 330, Bluetooth controller 300, WLAN module 302, and cellular module 304. In some embodiments, an interface 332 separate from the bus 326 couples the Bluetooth controller 300 with the WLAN module 302, and an interface 334 separate from the bus 326 couples the Bluetooth controller 300 with the cellular module 304. The interface 332 is used for communications between the Bluetooth controller 300 and WLAN module 302 regarding the WLAN status. The interface 334 is used for communications between the Bluetooth controller 300 and the cellular module 304 regarding the cellular network status. The interfaces 332 and 334, which may be referred to as status interfaces, may be combined in a single bus. Alternatively, the bus 326 is used for communications between the Bluetooth controller 300 and the WLAN module 302 and/or cellular module 304 regarding network status, and the interfaces 332 and/or 334 are omitted.

In some embodiments, instead of using three separate antennas 318, 320, and 322, one antenna may be shared between two or more (e.g., all) of the modules 302 and 304 and controller 300 using switching techniques. In some embodiments, the Bluetooth controller 300, WLAN module 302 and cellular module 304 may be located on the same circuit board or may be embedded on the same integrated circuit as a system on a chip (SoC). In some embodiments, the bus 326 is implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other interface. In some embodiments, the interfaces 332 and/or 334 are implemented as $I^2C$ busses, $I^2S$ busses, or other suitable interfaces.

In some embodiments, the wireless device 102 has an architecture in which the lower layers of the protocol stacks for Bluetooth, WLAN, and cellular communications are implemented in firmware and hardware in the Bluetooth controller 300, WLAN module 302, and WLAN module 304, respectively. The Bluetooth controller 300 includes a Low Energy Link Layer (LE LL) 306 for managing the radio frequency (RF) link 111 between the wireless device 102 and remote device 112 by performing advertisement, scanning, initiating, and connection functions. The Bluetooth controller 300 also includes a physical layer (PHY) 308 for performing the hardware-specific transmission and reception of wireless signals. For example, the PHY 308 may be a 1 Mbps adaptive frequency-hopping radio using Gaussian Frequency-Shift Keying (GFSK) in the 2.4 GHz Industrial, Scientific & Medical (ISM) band. The WLAN module 302 includes a PHY 312 for transmitting and receiving WLAN signals and a media access controller (MAC) 310 for processing frames corresponding to the transmitted and received signals. In some embodiments, the MAC 310 and PHY 312 operate in accordance with a protocol from the IEEE 802.11 family of protocols (e.g., a WiFi protocol). Similarly, cellular module 304 includes a media access controller/radio link controller (MAC/RLC) 314 that implements a data link layer and a PHY 316 that transmits and receives cellular signals.

Upper layers of the Bluetooth, WLAN, and/or cellular protocol stacks are implemented in software executed by the host processor 324. For example, drivers 328 corresponding to the upper layers of these protocol stacks are stored in the memory 330 (e.g., in a non-transitory computer-readable medium in the memory 330, such as one or more nonvolatile memory devices) and accessed by the host processor 324 over the bus 326. The drivers 328 include instructions that, when executed by the host processor 324, implement the upper layers of the Bluetooth, WLAN, and/or cellular protocol stacks.

The Bluetooth controller 300 includes an offloaded network availability (ONwA) module 336 that obtains information regarding network status from the WLAN module 302 and/or cellular module 304 independently of the host processor 324, and thus without execution of upper protocol stack layers by the host processor 324. For example, the Bluetooth controller 300 obtains network status information over status interfaces 332 and 334, respectively (or alternatively, over the bus 326). The status interfaces 332 and 334 are coupled, for example, to the ONwA module 336 of the Bluetooth controller 300. The status interface 332 is also coupled, for example, to the MAC 310 in the WLAN module 302, and the status interface 334 is also coupled to the MAC/RLC 314 in the cellular module 304. In some embodiments, one or both of the status interfaces 332 and 334 are implemented as a coexistence interface configured to coordinate operation of the Bluetooth controller 300 and network modules 302 and/or 304 in a manner that minimizes interference such as, for example, packet traffic arbitration using a 2-wire, 3-wire or 4-wire interface. The ONwA module 336 may be implemented as processor-readable instructions stored as firmware and executable by the Bluetooth controller 300 (e.g., as illustrated for the controller 600 in FIG. 6). The ONwA module 336 is configured to communicate information regarding network status (e.g., as obtained over status interfaces 332 and/or 334) to another device, such as the remote device 112, over a Bluetooth link 111 (FIG. 1).

Figure 4A:
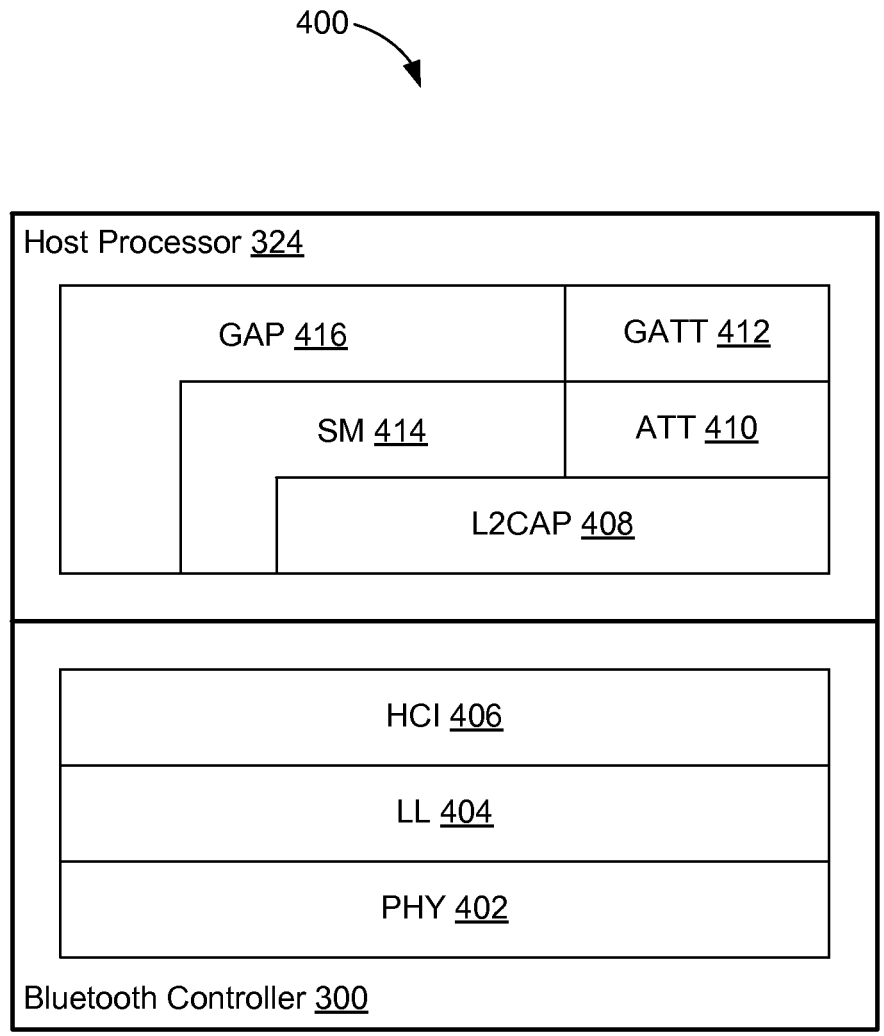
FIG. 4A is a block diagram of a Bluetooth Low Energy (BLE) protocol stack.

FIG. 4A is a block diagram of a BLE protocol stack 400 in accordance with version 4.0 of the Bluetooth Core Specification as published by the Bluetooth Special Interest Group. The BLE protocol stack 400 includes lower layers implemented in the Bluetooth controller 300 (FIG. 3) and upper layers implemented in the host processor 324 (FIG. 3). The lower layers implemented in the Bluetooth controller 300 include a PHY 402 (e.g., as implemented in the PHY 308, FIG. 3), a link layer (LL) 404 (e.g., as implemented in the LE LL 306, FIG. 3), and a host-controller interface (HCI) 406 (not shown in FIG. 3 for simplicity). The LL 404 controls the RF state of the Bluetooth controller 300. Possible states include standby, advertising, scanning initiating, and connected. The HCI 406 provides a standardized interface for communications between the Bluetooth controller 300 and the host processor 324. The HCI 406 may be implemented, for example, in software (e.g., using an application programming interface or API) or in hardware (e.g., using an interface such as a UART, SPI, or USB interface).

The upper layers of the BLE protocol stack 400, as implemented in the host processor 324, include a logical link control and adaptation protocol (L2CAP) layer 408, an attribute protocol (ATT) layer 410, a generic attribute profile (GATT) layer 412, a security manager (SM) layer 414, and a generic access profile (GAP) layer 416. The L2CAP layer 408 performs data encapsulation for the layers above it, including multiplexing data from the layers above it and formatting packets to be exchanged with the HCI 406. The ATT layer 410 allows the wireless device 102 to expose data known as attributes to other devices (e.g., to the remote device 112, FIG. 1), such that the other devices can access the attributes. When the wireless device 102 exposes attributes to the remote device 112, the wireless device 102 is referred to as an ATT server and the remote device 112 is referred to as an ATT client. The GATT layer 412 defines sub-procedures for using the ATT layer 410 and specifies the structure of BLE profiles. Data used by profiles and services in BLE are referred to as characteristics. GATT sub-procedures handle the communication of these characteristics. Profiles and applications thus interface with the GATT layer 412 for communication of characteristics. (A Bluetooth profile is a specification regarding an aspect of Bluetooth communication. A profile defines configurations and functions that enable a service provided using wireless communications.) The ATT layer 410 and GATT layer 412 together allow the remote device 112 (FIG. 1) to discover what services the wireless device 102 supports.

The SM layer 414 is used for secure connection and data exchange with other devices (e.g., with the remote device 112, FIG. 1). The SM layer 414 defines procedures for pairing and key distribution and provides encryption and identification functions. The GAP layer 416 handles device discovery and detection and initiates security features. Applications and profiles interface with the GAP layer 416 to perform discovery and connection.

A network availability (NwA) profile (e.g., as defined in Version 4.0 of the Bluetooth Core Specification) allows the wireless device 102 (FIG. 1) to determine status information regarding WLAN and/or cellular connections and provide this information to the remote device 112 (FIG. 1). The NwA profile uses the functionality of the ATT layer 410, GATT layer 412, and GAP layer 416 to provide the NwA service. Since the layers 410, 412, and 416 are upper level protocol layers implemented in software on the host processor 324, the NwA profile uses the host processor 324. This use of the host processor 324 causes power consumption that shortens the useful operational period of the wireless device 102 when the wireless device 102 is battery powered.

To avoid this power consumption and to reduce delays, the network availability service is offloaded from the host processor 324 to the Bluetooth controller 300 (FIG. 3), by including an ONwA module 336 (FIG. 3) in accordance with some embodiments. The lower portion of the BLE protocol stack, as implemented in the Bluetooth controller 300, is modified from that of FIG. 4A to support the operation of the ONwA module 336.

Figure 4B:
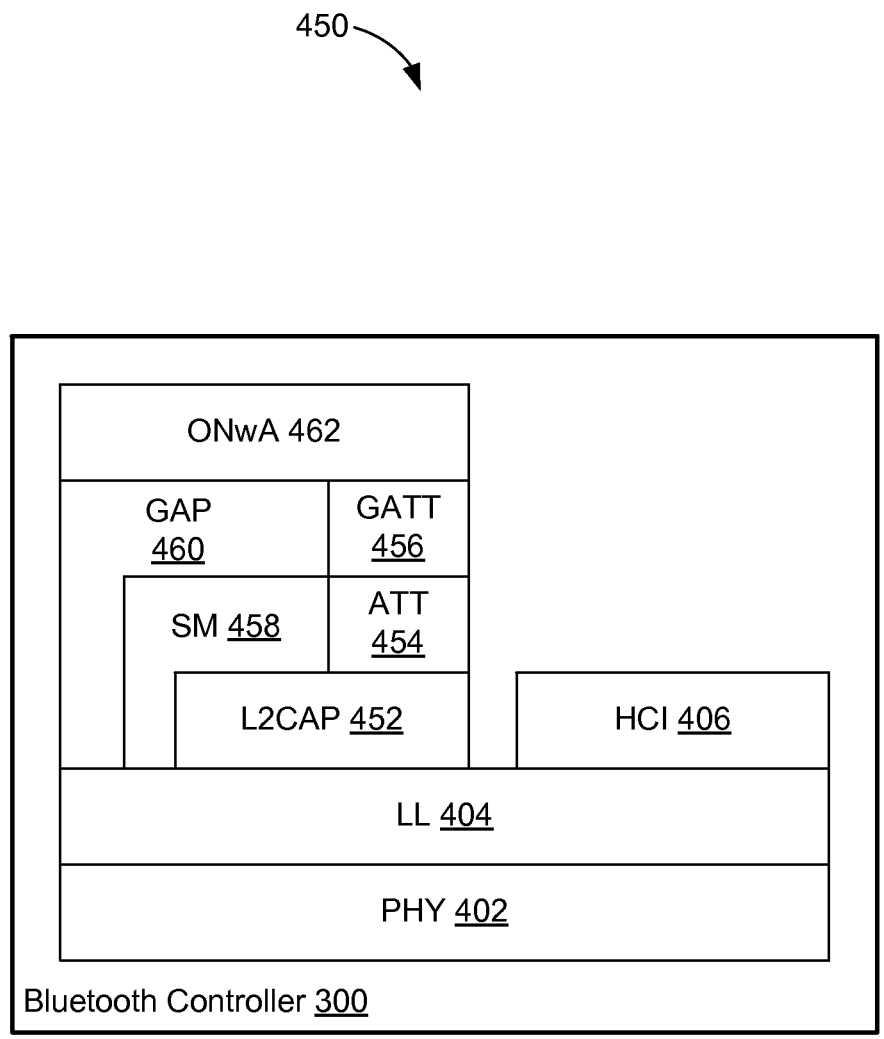
FIG. 4B is a block diagram of a portion of a BLE protocol stack as modified to provide an offloaded network availability service in accordance with some embodiments.

FIG. 4B is a block diagram of a lower portion of a BLE protocol stack 450, as modified to support the operation of the ONwA module 336 in accordance with some embodiments. The BLE protocol stack portion 450 allows the Bluetooth controller 300 to provide the ONwA service 204 (FIG. 2) independently of the host processor 324. In the protocol stack portion 450, the PHY 402, LL 404, and HCI 406 function as described for the protocol stack 400 (FIG. 4A). The L2CAP layer 452, ATT layer 454, GATT layer 456, SM layer 458, and GAP layer 460 replicate at least a portion of the functions of the corresponding layers 408, 410, 412, 414, and 416, to support the functionality of an ONwA profile 462. In some embodiments, the ONwA profile 462, L2CAP layer 452, ATT layer 454, GATT layer 456, SM layer 458, and GAP layer 460 are implemented in the ONwA module 336 (FIG. 3). The replication of upper BLE protocol stack functionality (e.g., of ATT, GATT, and/or GAP functions) in the Bluetooth controller 300 (e.g., in the ONwA module 336) makes operation of the ONwA service 204 (FIG. 2) transparent from the perspective of a network monitor 200 (FIG. 2) (e.g., the remote device 112, FIG. 1). For example, the ONwA module 336 is configured to replicate the behavior of a GATT server and a GAP central, and a network monitor 200 operates as a GATT client and a GAP peripheral.

The ONwA module 336 allows the Bluetooth controller 300 to determine information regarding WLAN and/or cellular network status (e.g., via status interfaces 332 and/or 334, or via bus 326) and write the information as characteristics that the remote device 112 may read over the link 111 (FIG. 1). Further, the ONwA module 336 may also provide a notification when the network status (e.g., WLAN and/or cellular connectivity status) of the wireless device 102 changes. Providing notification of network status changes saves power in a network monitor 200 (FIG. 2) (e.g., the remote device 112, FIG. 1) by reducing or eliminating polling by the network monitor 200 to obtain the status information.

In some embodiments, the ONwA module 336 is configured to respond to a GATT Discover All Primary Services procedure initiated by a network monitor 200 to report the instance of ONwA service 204 provided by the ONwA module 336. Further, the ONwA module 336 may be configured to respond to a GATT Discover All Characteristics of a Service procedure initiated by the network monitor 200 to report the characteristics associated with the ONwA module 336. The ONwA module 336 may also be configured to respond to a GATT Read Characteristic Value procedure initiated by the network monitor 200 to report the value of the network availability characteristic. In some embodiments, the network availability characteristic is a single bit, indicating whether or not the network reporter 202 (FIG. 2) (e.g., the wireless device 102, FIG. 1) is connected to a network. Alternatively, the network availability characteristic includes a first bit to indicate whether the network reporter 202 has WLAN connectivity and a second bit to indicate whether the network reporter 202 has cellular network connectivity. Furthermore, the network availability characteristic may include additional bits to provide additional information regarding network connectivity status, including for example the type of network, signal strength, and/or data rate.

In some embodiments the ONwA module 336 is configured to respond to a GATT Write Characteristic Descriptors procedure initiated by the network monitor 200 to set the Notification bit in the Client Characteristic Configuration descriptor to enable the ONwA service 204 to notify the network monitor 200 of changes to the network status. For example, the ONwA module 336 may be configured to replicate the GATT Notification procedure to report changes in network availability to the network monitor 200.

In some embodiments, the ONwA module 336 is configured to perform or respond to GAP Limited Discoverable Mode procedures initiated by the network monitor 200 to allow connection to unbonded devices. Unbonded devices are devices with which the network monitor 200 has not yet established a secure connection. Similarly, the ONwA module 336 may be configured to perform or respond to GAP Undirected Connectable Mode procedures initiated by the network monitor 200 to allow connection to bonded devices. Further, the ONwA module 336 may be configured to perform or respond to any suitable GAP connection procedure in the event of a link loss with the network monitor 200.

Figure 5A:
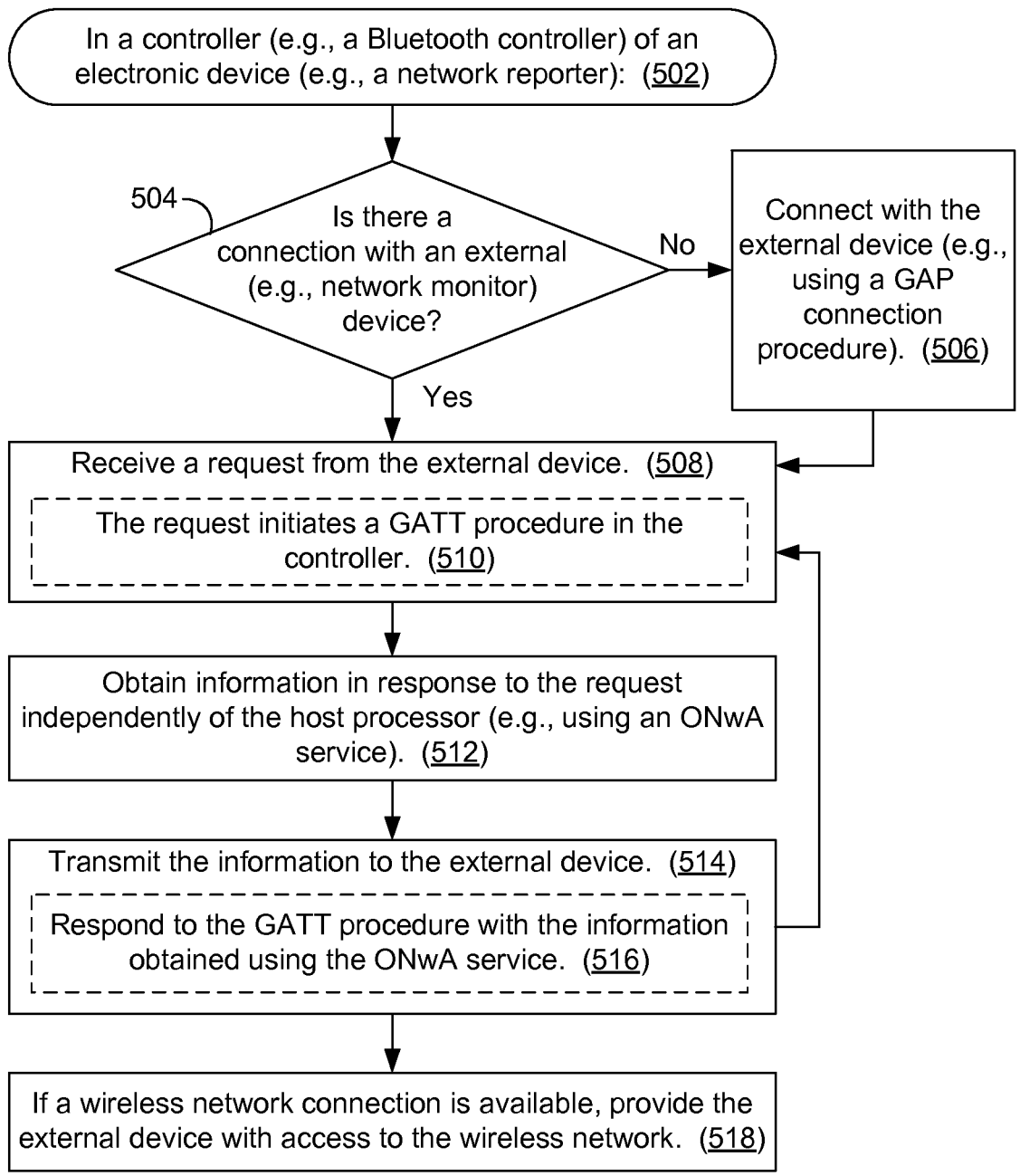
FIGS. 5A and 5B are flowcharts illustrating methods of operating a controller in an electronic device in accordance with some embodiments.
Figure 5B:
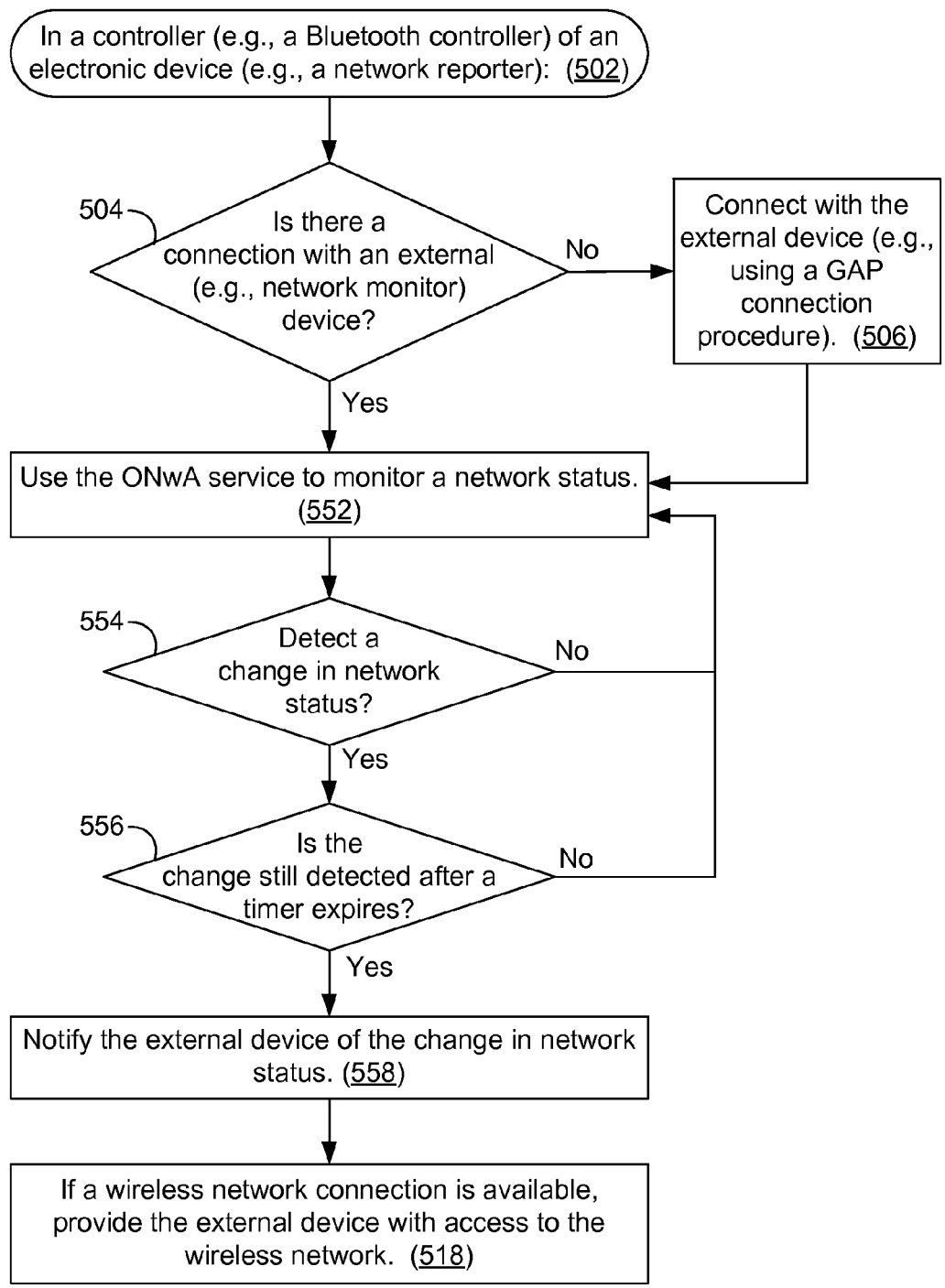

FIGS. 5A and 5B are flowcharts illustrating respective methods 500 and 550 of operating a controller in an electronic device (e.g., a network reporter device 202, FIG. 2, such as the wireless device 102, FIG. 1) in accordance with some embodiments. The controller (e.g., Bluetooth controller 300, FIG. 3) is coupled to a host processor (e.g., host processor 324, FIG. 3) and one or more wireless modules (e.g., WLAN module 302 and/or cellular module 304, FIG. 3) and is configured to communicate wirelessly with an external device (e.g., a network monitor 200, FIG. 2, such as the remote device 112, FIG. 1). The methods 500 and 550 are performed (502) in the controller.

In the method 500 (FIG. 5A), a determination is made (504) as to whether a connection (e.g., a Bluetooth connection over a link 111, FIG. 1) with the external device exists. This determination is made, for example, by the ONwA module 336 (FIG. 3). If no connection exists (504—No), a connection is established (506). For example, the ONwA module 336 performs a GAP connection procedure using the GAP layer 460 of the controller's protocol stack 450 (FIG. 4B). Because the controller's protocol stack 450 duplicates the GAP functionality of the GAP layer 416 (FIG. 4A) as implemented in the host processor 324 (FIG. 3), the connection is established (506) independently of the host processor 324.

If a connection to the external device exists (504—Yes), or once the connection is established (506), a request (e.g., a query) is received (508) from the external device. In some embodiments, the request initiates a GATT procedure (e.g., in accordance with the GATT layer 456 of the controller's protocol stack 450, FIG. 4B) (510). Because the controller's protocol stack 450 duplicates the GATT functionality of the GATT layer 412 (FIG. 4A) implemented in the host processor 324 (FIG. 3), the controller 300 is able to process the request independently of the host processor 324.

Examples of the request received in the operation 508 include a request for the status (e.g., the availability, connection status, network type, signal strength, data rate, etc.) of a wireless network (e.g., a WLAN associated with WLAN module 302 or a cellular network associated with cellular module 304, FIG. 3), a service discovery request, and a service characteristics discovery request.

Information is obtained (512) in response to the request independently of the host processor (e.g., using an ONwA service 204, FIG. 2). For example, the ONwA module 336 (FIG. 3) obtains information regarding the WLAN status from the WLAN module 302 (FIG. 3) and/or information regarding the cellular network status from the cellular module 304 (FIG. 3). In another example, information is obtained from the ONwA module 336 (FIG. 3) indicating the availability of the ONwA service 204 (FIG. 2), in response to a service discovery request. In some embodiments, one or more characteristics of the ONwA service 204 are obtained in response to a service characteristics discovery request.

The information obtained in the operation 512 is transmitted (514) to the external device (e.g., over the link 111, FIG. 1). For example, the ONwA module 336 (FIG. 3) responds (516) to the GATT procedure initiated in operation 510 with the information obtained in the operation 512; the controller 300 then transmits this information to the external device. As described above, this information may include information regarding the ONwA service 204 (FIG. 2), information regarding the characteristics of the ONwA service 204, and/or information regarding network status, depending upon the request received from the external device (e.g., depending on the procedure called by the network monitor 200, FIG. 2).

The operations 508, 512, and 514 (including, for example, the operations 510 and 516) may be performed repeatedly for different requests from the external device.

In some embodiments, if a wireless network connection (e.g., a WLAN connection or cellular connection) is available, the external device is provided (518) with access to the wireless network. For example, the controller 300 provides wireless network access to the network monitor 200 (FIG. 2) (e.g., the remote device 112, FIG. 1) in conjunction with the WLAN module 302 or cellular module 304, independently of the host processor 324 (FIG. 3). The external device may use this access to upload data to and/or download data from a network (e.g., the network 106 or 110, FIG. 1). Downloaded data may be displayed, for example, on the user interface 113 (FIG. 1). The operations 508, 512, and 514 (including, for example, the operations 510 and 516) allow the external device to confirm network availability before accessing the network.

In the method 550 (FIG. 5B), the operations 504 and 506 are performed as described for the method 500 (FIG. 5A). If a connection to the external device exists (504—Yes), or once the connection is established (506), the ONwA service 204 (FIG. 2) (e.g., as implemented in the ONwA module 336, FIG. 3) is used to monitor a network status (e.g., for a WLAN associated with the WLAN module 302 or a cellular network associated with the cellular module 304, FIG. 3). For example, the ONwA module 336 receives network status information from the WLAN module 302 or cellular module 304 (FIG. 3) and compares current network status information with previously stored network status information to determine whether a change in network status has occurred. The network status may include, for example, the network availability, connection status, signal strength, and/or data rate.

In some embodiments, if a change in the network status is detected (554—Yes), the external device is notified (558) of the change. In some embodiments, if a change in the network status is detected (554—Yes), a timer is started. If the change is still detected upon expiration of the timer (556—Yes), the external device is notified (558) of the change. The timer may, for example, have a duration in the range of 1-5 seconds (e.g., 3 seconds). Use of the timer filters out transient changes in network status, such that the external device is not notified of changes with durations shorter than the duration of the timer.

If no change in the network status is detected (554—No), or if a change is detected but is no longer detected upon expiration of the timer (556—No), then no notification is provided to the external device and the ONwA service 204 continues to monitor (552) the network status.

In some embodiments, if a wireless network connection (e.g., a WLAN connection or cellular connection) is available, the external device is provided (518) with access to the wireless network, as described for the method 500 (FIG. 5A). The operations 552, 554, 556, and 558 allow the external device to confirm network availability before accessing the network.

In some embodiments, all or a portion of the methods 500 and/or 550 are performed using the controller 300 (FIG. 3) while the host processor 324 (FIG. 3) is in a power-saving mode. For example, the host processor 324 exits a normal operating mode and enters a power-saving mode when it is idle, such that the host processor 324 consumes less power in the power-saving mode than in the normal operating mode. This transition may occur before or during the method 500 or 550, and performance of operations in the method 500 or 550 does not cause the host processor 324 to transition back from the power-saving mode to the normal operating mode.

While the methods 500 and 550 include a number of operations that appear to occur in a specific order, it should be apparent that the methods 500 and 550 can include more or fewer operations, which can be executed serially or in parallel. An order of two or more operations may be changed and two or more operations may be combined into a single operation. Also, the methods 500 and 550, or portions thereof, may be combined into a single method.

Figure 6:
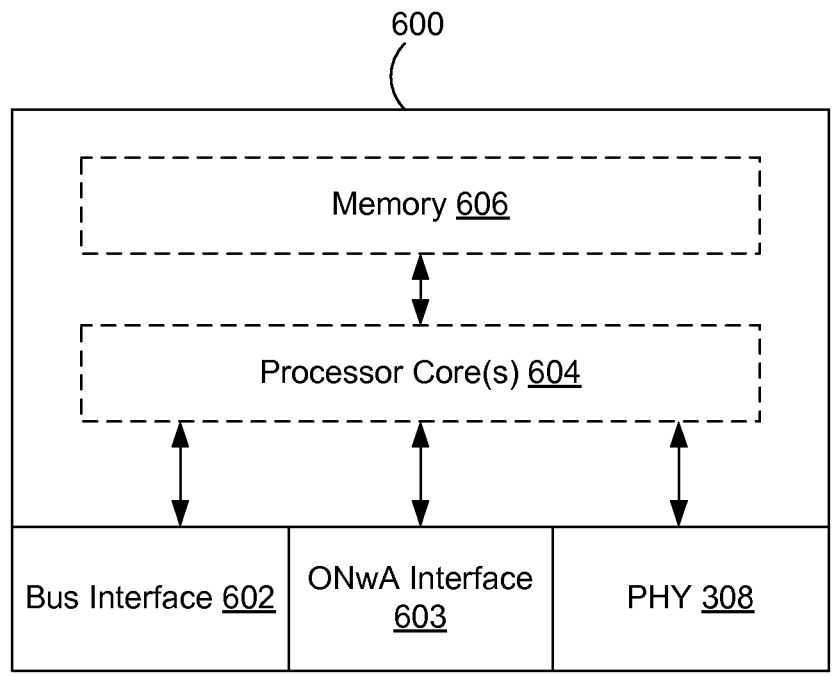
FIG. 6 is a block diagram of a controller in accordance with some embodiments.

In some embodiments, the LE LL 306 and ONwA module 336 of the Bluetooth controller 300 (FIG. 3), or analogous elements of an analogous controller for a different wireless communications protocol, are implemented in software (e.g., in firmware). FIG. 6 is a block diagram of a controller 600 that is an example of such a Bluetooth controller 300 (or analogous controller) in accordance with some embodiments. The controller 600 includes the PHY 308, as described for FIG. 3, and also includes a bus interface 602 to connect to the bus 326 (FIG. 3) and an optional ONwA interface 603 to connect to the interfaces 332 and 334 (FIG. 3). The PHY 308, bus interface 602, and ONwA interface 603 are coupled to one or more processor cores 604, which are coupled to memory 606. In some embodiments, the memory 606 includes a non-transitory computer-readable medium (e.g., one or more nonvolatile memory elements, such as EPROM, EEPROM, Flash memory, and so on) that stores instructions for execution by the one or more processor cores 604. The instructions include instructions that, when executed by the processor core(s) 604, cause the controller 600 to perform all or a portion of the methods 500 and/or 550 (FIGS. 5A-5B). For example, the instructions include instructions that, when executed by the processor core(s) 604, implement the functionality of layers 404, 406, 452, 454, 456, 458, 460, and/or 462 of the protocol stack 450 (FIG. 4B).

While the memory 606 is shown as being separate from the processor core(s) 604, all or a portion of the memory 606 may be embedded in the processor core(s) 604. In some embodiments, the memory 606 is implemented in the same integrated circuit as the processor core(s) 604, PHY 308, and interfaces 602 and 603.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. For example, while embodiments have been described with regard to the BLE systems, other embodiments may be implemented in other wireless communication systems having devices with analogous network monitor and network reporter roles. The specification and drawings are, accordingly, to be regarded in an illustrative sense rather than a restrictive sense.

What is claimed is:

1. An electronic device, comprising:
a host processor;
a module, coupled to the host processor, to communicate over a wireless network using a first wireless communications protocol; and
a controller, coupled to the host processor and the module, to communicate wirelessly with a remote device using a second wireless communications protocol, to obtain a status of the wireless network from the module independently of the host processor, and to transmit the status of the wireless network to the remote device.

2. The electronic device of claim 1, wherein the controller is to receive a notification of a change in the status of the wireless network from the module independently of the host processor and to provide the notification to the remote device.

3. The electronic device of claim 1, wherein:
the host processor is configured to implement a first portion of a protocol stack corresponding to the second wireless communications protocol;
the controller is configured to implement a second portion of a protocol stack corresponding to the second wireless communications protocol; and
the controller is further configured to duplicate a function of the first portion of the protocol stack to respond to a query from the remote device independently of the host processor.

4. The electronic device of claim 3, wherein:
the query comprises a service discovery request; and
the controller is to respond to the service discovery request by executing the duplicated function, wherein the duplicated function is to provide an indication of an ability of the controller to provide the status of the wireless network.

5. The electronic device of claim 3, wherein:
the query comprises a service characteristics discovery request; and
the controller is to respond to the service characteristics discovery request by executing the duplicated function, wherein the duplicated function is to report a characteristic associated with an ability of the controller to provide the status of the wireless network.

6. The electronic device of claim 1, further comprising an interface to provide the status of the wireless network from the module to the controller independently of the host processor.

7. The electronic device of claim 1, wherein the wireless network is a wireless local area network (WLAN), the first wireless communications protocol is a WLAN protocol, and the second wireless communications protocol is a Bluetooth protocol.

8. The electronic device of claim 1, wherein the wireless network is a cellular network, the first wireless communications protocol is a cellular protocol, and the second wireless communications protocol is a Bluetooth protocol.

9. The electronic device of claim 1, wherein the second wireless communications protocol is a Bluetooth Low Energy protocol.

10. The electronic device of claim 1, wherein the controller is to establish a connection with the remote device independently of the host processor.

11. The electronic device of claim 1, wherein:
the host processor is to enter a power saving mode when idle; and
the controller is to obtain the status of the wireless network from the module and provide the status of the wireless network to the remote device without waking the host processor from the power-saving mode.

12. The electronic device of claim 1, wherein the module and the controller are to provide the remote device access to the wireless network independently of the host processor.

13. The electronic device of claim 1, wherein:
the module is a first module and the wireless network is a first wireless network;
the electronic device further comprises a second module, coupled to the host processor, to communicate over a second wireless network using a third wireless communications protocol; and
the controller is coupled to the second module and is to obtain a status of the second wireless network from the second module independently of the host processor and to provide the status of the second wireless network to the remote device.

14. A method of wireless communication, comprising:
in a controller in an electronic device:
obtaining a status of a wireless network that uses a first wireless communications protocol from a module in the electronic device for communicating using the first wireless communications protocol, wherein the status of the wireless network is obtained from the module independently of a host processor in the electronic device; and
transmitting the status of the wireless network to a remote device using a second wireless communications protocol.

15. The method of claim 14, further comprising receiving a request from the remote device for the status of a wireless network;
wherein the status of the wireless network is obtained and transmitted in response to the request; and
wherein the request is received using the second wireless communications protocol.

16. The method of claim 14, further comprising:
detecting a change in the status of the wireless network;
communicating the change in the status of the wireless network from the module to the controller independently of the host processor; and
in the controller, transmitting notification of the change in the status of the wireless network to the remote device.

17. The method of claim 14, further comprising:
in the controller, establishing a connection with the remote device independently of the host processor.

18. The method of claim 14, further comprising:
in the host processor, transitioning from a normal operating mode to a power saving mode when idle;
wherein the receiving, obtaining, and transmitting are performed when the host processor is in the power saving mode.

19. The method of claim 14, further comprising, in the controller:
receiving a service discovery request from the remote device; and
responding to the service discovery request independently of the host processor.

20. The method of claim 14, further comprising, in the controller:
  receiving a service characteristics discovery request from the remote device; and
  responding to the service characteristics discovery request independently of the host processor.

21. A non-transitory computer-readable storage medium storing one or more programs configured to be executed by a controller in an electronic device, the one or more programs comprising:
  instructions to obtain a status of a wireless network from a module in the electronic device for communicating using a first wireless communications protocol, wherein the status of the wireless network is to be obtained independently of a host processor in the electronic device; and
  instructions to transmit the status of the wireless network to a remote device using a second wireless communications protocol.

22. The computer-readable storage medium of claim 21, wherein the instructions to obtain the status of the wireless network comprise instructions to obtain the status of the wireless network in response to a request received at the controller from the remote device using the second wireless communications protocol.

23. The computer-readable storage medium of claim 21, wherein the one or more programs further comprise:
  instructions to determine whether the status of the wireless network has changed; and
  instructions to transmit notification of a change in the status of the wireless network to the remote device.

24. The computer-readable storage medium of claim 21, wherein the one or more programs further comprise instructions to establish a connection with the remote device independently of the host processor.

25. The computer-readable storage medium of claim 21, wherein the one or more programs further comprise instructions to respond, independently of the host processor, to a service discovery request from the remote device.

26. The computer-readable storage medium of claim 21, wherein the one or more programs further comprise instructions to respond, independently of the host processor, to a service characteristics discovery request from the remote device.

27. An electronic device, comprising:
  a host processor;
  means for communicating over a wireless network using a first wireless communications protocol; and
  means for communicating with a remote device using a second wireless communications protocol, comprising means for obtaining a status of the wireless network independently of the host processor and for transmitting the status of the wireless network to the remote device.

28. The electronic device of claim 27, wherein the means for obtaining the status of the wireless network comprise means for obtaining the status of the wireless network in response to a request from the remote device.

29. The electronic device of claim 27, wherein the means for communicating with the remote device comprise means for determining whether the status of the wireless network has changed and for transmitting notification of a change in the status of the wireless network to the remote device.

30. The electronic device of claim 27, wherein the means for communicating with the remote device comprise means for establishing a connection with the remote device independently of the host processor.

31. The electronic device of claim 27, wherein the means for communicating with the remote device comprise means for responding, independently of the host processor, to a service discovery request from the remote device.

32. The electronic device of claim 27, wherein the means for communicating with the remote device comprise means for responding, independently of the host processor, to a service characteristics discovery request from the remote device.

* * * * *